(No Model.)
R. D. SCOTT.
VEHICLE GEAR.
No. 553,692. Patented Jan. 28, 1896.
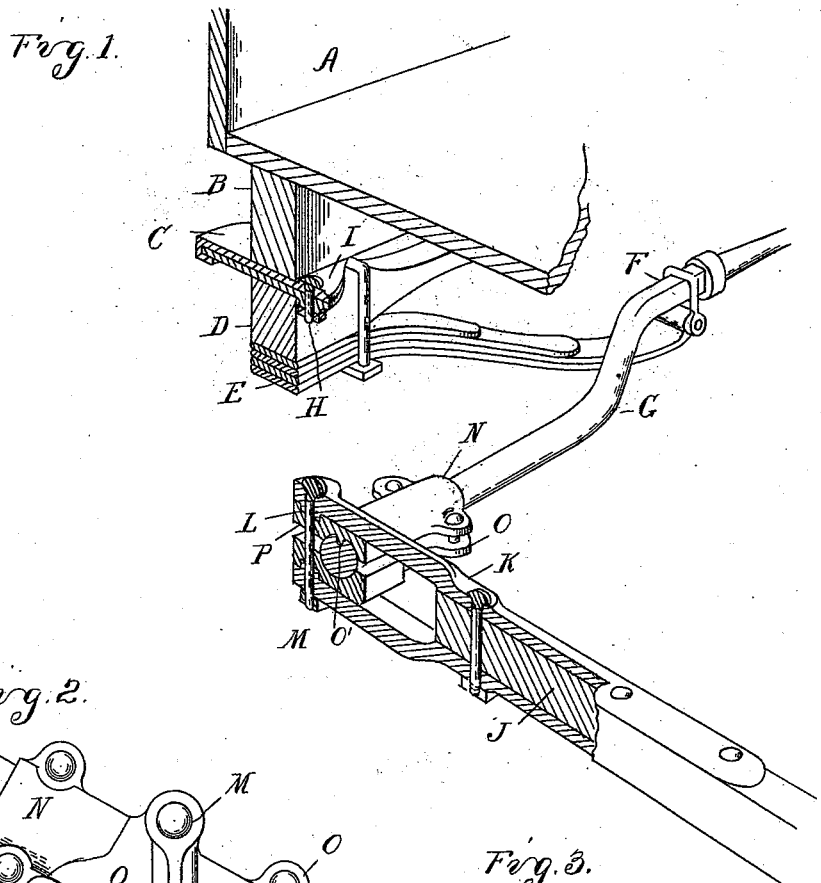
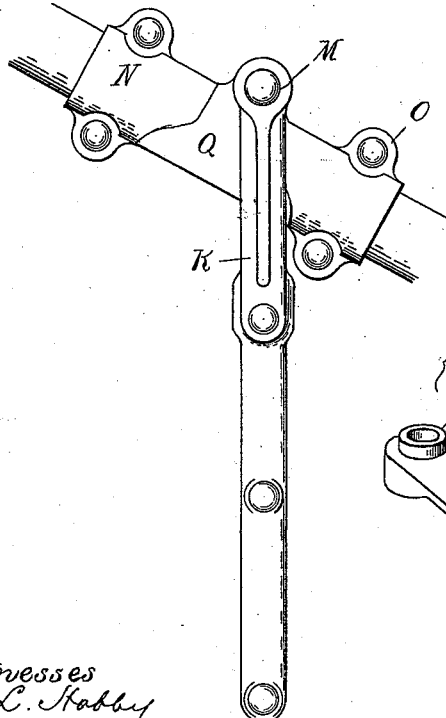
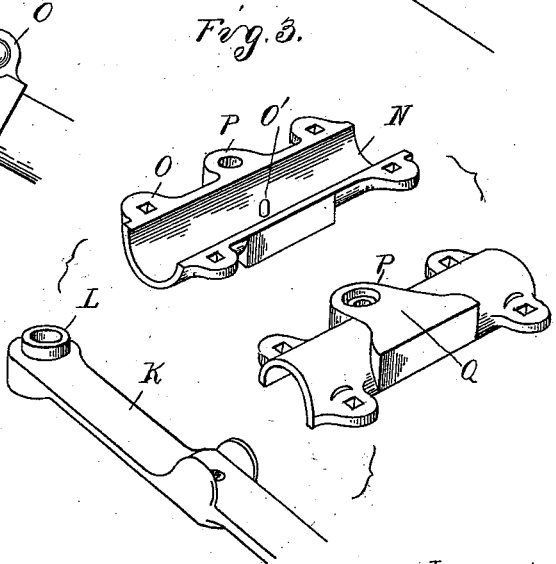
Witnesses
A. L. Hobby
O. F. Barthel
Inventor
Robert D. Scott
By  Attys.

UNITED STATES PATENT OFFICE.

ROBERT D. SCOTT, OF PONTIAC, MICHIGAN.

VEHICLE-GEAR.

SPECIFICATION forming part of Letters Patent No. 553,692, dated January 28, 1896.

Application filed October 21, 1895. Serial No. 566,328. (No model.)

*To all whom it may concern:*

Be it known that I, ROBERT D. SCOTT, a citizen of the United States, residing at Pontiac, in the county of Oakland and State of Michigan, have invented certain new and useful Improvements in Vehicle-Gear, of which the following is a specification, reference being had therein to the accompanying drawings.

The invention consists in the construction of a reach-coupling; and it consists in the peculiar construction and arrangement of a connection between the forward end of the reach and the front axle, whereby the construction is cheapened, strengthened and improved, all as more fully hereinafter described.

In the drawings, Figure 1 is a sectional perspective of the front of a wagon or carriage, showing my improvement. Fig. 2 is a top plan view of the reach-coupling as in use. Fig. 3 is a perspective view of the parts detached.

A represents the wagon box or body.

B is the bolster; C, the fifth-wheel plates; D, the spring-bar; E, a semielliptic spring which at its ends is suspended from the straight portions F of the axles near the hubs. (Not shown.) To permit the free vertical motion of the spring E, the axles have the downward and rearward bend G at each end. In this type of gear it is customary to place the king-bolt H in a rearward extension I of the circle-plates, and it has been customary to place the reach pivot-bolt through the front of the reach and through the axle. This ordinarily brings the king-bolt and reach-bolt out of line and causes cramping and liability of breakage in turning, or else requires so great a rearward extension of the circle-plates as to be impracticable. Inasmuch as the axle is downwardly "cranked" at the ends and the reach is connected at the middle, there is a constant tendency to turn the axle, which tends to wear and break the reach connection. My construction is intended to overcome these difficulties, and is as follows:

J is the reach.

K are top and bottom metallic extension-arms at the forward end of the reach, separated at their forward portions to embrace the axle and preferably having the ring-shaped lugs L on their contiguous faces at the outer end, which form reinforcements for the bolt M which passes through apertures in the ends of the plates K.

N are two recessed plates fitting on the axle and inclosing the same, being clamped thereon by bolts or screws passing through apertures in the ears O. On round axles the pin O' enters a recess in the axle to prevent turning of the plates on the axle.

P are extensions on the middle of the forward face of the plates N apertured in line and having countersinks to receive the lugs L. The bolt M passes through the apertures of the reach extensions.

The plates N have the flat faces Q centrally on their upper and lower faces, the arms K extending over these flat portions. The parts being thus constructed and combined, it will be seen that the forward extension of the plates N brings the pivot M in front of the axle and nearer in line with the bolster, and thus the rearward extension of plates C can be materially lessened. The plates N serve to strengthen the axle at the point the reach connects instead of weakening it by passing the bolt therethrough, as in previous constructions. The flat faces Q moving in contact with the inner faces of the arms K serve to counteract the turning tendency of the axle, due to the crank construction thereof, and thus largely reduce danger of breakage of these parts.

What I claim as my invention is—

1. The combination with a rearwardly and downwardly cranked axle, of a reach connection centrally on said axle, comprising plates clamped on the axle, forward extensions centrally on said plate, reach extension arms above and below said plates and a pivot passing through the forward extensions on the plates and the ends of the reach extension arms, substantially as described.

2. The combination with the downwardly and rearwardly cranked axle of the reach, forward extension arms thereon separated to embrace the axle, plates clamped on the axle, forwardly extending apertured lugs on these plates, having countersinks ring shaped reinforcements L on the arms entering the countersinks, a bolt passing through the arms and the extensions of the plates, substantially as described.

3. The combination with the downwardly and rearwardly cranked axle, of the reach, the plates N clamped centrally on the axle, forward apertured extensions thereon, the flat bearing faces Q on top and bottom thereof, and the reach extension arms pivoted in the forward extensions of the plates and embracing the faces Q, as and for the purpose described.

In testimony whereof I affix my signature in presence of two witnesses.

ROBERT D. SCOTT.

Witnesses:
JAS. WHITTEMORE,
O. F. BARTHEL.